(12) United States Patent
de Jong

(10) Patent No.: US 6,349,260 B1
(45) Date of Patent: Feb. 19, 2002

(54) METHOD FOR NAVIGATING A TERRESTRIAL VEHICLE

(75) Inventor: Cornelis Dick de Jong, Helmond (NL)

(73) Assignee: Mannesman VDO AG (DE)

( * ) Notice: Subject to any disclaimer, the term of this patent is extended or adjusted under 35 U.S.C. 154(b) by 0 days.

(21) Appl. No.: 09/655,953

(22) Filed: Sep. 6, 2000

(30) Foreign Application Priority Data

Sep. 21, 1999 (DE) .......................................... 199 45 119

(51) Int. Cl.[7] .............................................. G01C 21/00
(52) U.S. Cl. ...................................... 701/207; 701/200
(58) Field of Search ................................ 701/200, 207, 701/213, 214, 216, 24, 23; 342/357.01, 357.05, 357.08

(56) References Cited

U.S. PATENT DOCUMENTS

| 5,828,585 A | 10/1998 | Welk et al. .................. 364/565 |
| 5,862,511 A | 1/1999 | Croyle et al. ................ 701/213 |
| 5,890,092 A | 3/1999 | Kato et al. ................... 701/216 |
| 5,917,434 A | 6/1999 | Murphy ....................... 340/991 |

FOREIGN PATENT DOCUMENTS

EP   0 838 660 A1   4/1998

OTHER PUBLICATIONS

Japan Abstract: JP0110173870AA; 02.07.99 (in English).

*Primary Examiner*—Yonel Beaulieu
(74) *Attorney, Agent, or Firm*—David M Thimmig; Mayer, Brown & Platt

(57) ABSTRACT

A method for calibration of a path length variable being used for navigating a terrestrial vehicle. The path length variable is measured by determining the number of revolutions of a wheel. For calibration of this value, two speed values are ascertained. A first speed value is determined using the number of revolutions of the wheel and a second speed value is determined using at least one external position sensor. One of the speed values is classified in a plurality of classes, and a calibration value in a class is ascertained using the speed values from this class.

14 Claims, 1 Drawing Sheet

METHOD FOR NAVIGATING A TERRESTRIAL VEHICLE

BACKGROUND OF THE INVENTION

The invention relates to a method for navigating a terrestrial vehicle, in which a path length variable is measured using the number of revolutions of a wheel.

Such a method is used in a "Carin" navigation system, for example.

The demand for navigation aids has increased continuously in recent years. The aim here is to be able to indicate to the driver of a motor vehicle the best possible route for him to be able to reach the destination from a starting location. In this context, the overall task is divided into three parts, namely determining the position of the vehicle, route planning, and transmitting the route to the driver. The present invention relates to the first part, namely determining the position of the vehicle.

To determine the position of the vehicle, navigation satellites forming part of a global positioning system, or GPS, have been available for some time. Although the satellites can be used everywhere to determine a location or position with few restrictions, the accuracy which they are able to achieve is only within a range of 100 m. For inter-urban journeys, this may be sufficient in most cases. However, this "inaccuracy" is critical where the distance between roads is less than this magnitude, for example in towns or at traffic junctions, where a number of roads meet one another within a relatively short distance.

Hence, in particular fields, the use of "compound navigation" has taken over, where the position of the vehicle is determined by ascertaining the direction and distance from a starting point. This type of navigation is also called "dead reckoning".

For this distance measurement, it is possible to use a vehicle wheel, for example, which already runs on the ground. One revolution of the wheel then corresponds to a particular distance covered.

However, a prerequisite of this assumption is that the conditions of the wheel are and remain constant. This has been found not to be the case. There are a number of influencing variables in this context. It is easily imaginable that, in the case of air-filled rubber tires, for example, centrifugal forces act on the wheel when the vehicle is moving at relatively high speeds. Although the change in diameter and the associated change in the distance covered per wheel revolution is only in the percent range, when a distance of 10 km is covered, there is again an inaccuracy of approximately 100 m. A further influential factor is that the vehicle is raised or lowered to a greater or lesser extent by air currents, depending on its speed. This also has an effect on the tire circumference. Finally, thermal aspects must also not be overlooked. Heating of the tire, as may occur relatively quickly in summer, for example, and otherwise after a relatively long journey, can result in the tire diameter changing. The diameter also changes in the event of losses of tire pressure. Long-term changes result from wear on the tread.

SUMMARY OF THE INVENTION

The invention is based on the object of being able to use more accurate principles for navigation.

This object is achieved for a method of the type mentioned in the introduction by the path length variable being calibrated by means of at least one external position sensor.

It is thus no longer necessary to rely on the use of a fixed "conversion factor" between the number of revolutions of the wheel and the distance covered. Instead, this conversion factor can be changed if there is a need to do so. The distance covered can additionally be determined by using one or more external position sensors, for example satellites, and comparing the distance values obtained by means of this position sensor with the distance values obtained by means of the wheel. The information a obtained using the satellites is not used directly for position determination, but rather only indirectly to improve the accuracy of the measurement results.

Preferably, for calibration purposes, a first speed value is ascertained using the number of revolutions of the wheel and a second speed value is ascertained by means of the external position sensor, and the two speed values are used for calibration. As mentioned above, determination of the absolute position of the vehicle with respect to the external position sensor is likewise subject to certain inaccuracies. In addition, when satellites are used as position sensors, for example, a position signal can be obtained only at a frequency of approximately 1 Hz. However, the speed with respect to the position sensors can be obtained with a relatively higher degree of accuracy. If the speed is ascertained from the wheel revolution in the same way, two variables are readily obtained which can easily be related to one another.

In this context, it is particularly preferable for the second speed value to be determined by means of the Doppler effect. This provides a highly accurate procedure for determining the speed with respect to the position sensor. To be able to utilize the Doppler effect, it is sufficient to record a small number of oscillations of a signal output by the external position sensor, for example from a satellite. This provides information, at short intervals, about the current speed of the vehicle, which corresponds with a relatively high degree of accuracy to the actual speed of the vehicle.

Preferably, calibration is ongoing, at least in sections. This means that it is also possible to compensate for changes which arise during the journey, for example as a result of changing temperature conditions, speeds or the like.

Advantageously, one of the two speed values is classified in one of a plurality of classes, each of which comprises a predetermined speed range, and a calibration value in a class is ascertained using the speed values from this class. In this context, consideration is given to the fact that calibration on the basis of the number of revolutions of a wheel is more accurate the higher the speed, i.e., the more often the wheel turns per unit time. The reason for this is that the speed values determined by means of the Doppler effect are more accurate at higher speeds. If the "conversion factor" is now ascertained at a relatively high speed, then there is a high probability that this is more accurate than a conversion factor ascertained at a relatively low speed. This means that a speed dependency of the length per pulse can also be taken into account.

In this context, it is preferable if, at predetermined speeds, a calibration value from a predetermined higher speed class is used to ascertain the distance, if this calibration value is present. Hence, the higher accuracy at higher speeds is also utilized when the vehicle is traveling relatively slowly.

The case may arise, however, where calibration at a relatively high speed has not yet been possible, for example at the beginning of a journey. In this case, either a calibration from the lower speed class or from the lower speed range is used.

Advantageously, each calibration value is ascertained from a multiplicity of calibration operations. This increases the accuracy. If an error occurs in one calibration operation, this error is of only minor significance. By way of example, a calibration value may also be regarded as "valid" only if a predetermined minimum number of calibration operations has taken place.

The calibration value is preferably formed by filtering the results of the individual calibration operations. This filtering smooths the curve for the results of the individual calibration operations and thus, makes the calibration value more uniform. This bears in mind that sudden changes in the distance covered per revolution are relatively rare. Hence, although corresponding measurement results may be taken into account should they arise, their influence on the calibration is small.

Preferably, calibration is not carried out if the acceleration ascertained by means of the external position sensor exceeds a predetermined acceleration value. In this case, the measurement results are discarded, for example. If the vehicle is accelerated or braked, the necessary information about the speed, for example, is not available with the required degree of constancy.

Preferably, the predetermined acceleration value is 1 m/s$^2$. It has been found that a severe reduction in accuracy can be observed for acceleration values above this limit.

Preferably, calibration is not carried out if the speed ascertained by means of the external position sensor is lower than 5 m/s. This takes account of the fact that ascertaining the speed with respect to a number of external position sensors is subject to a systematic error which often has a fixed magnitude. The lower the speed, the greater the effect of this error. The higher the speed, the less significance can be attached to the error.

Preferably, the path length variable ascertained is a distance per pulse, the pulses being integrated until a new signal is available from the external position sensor. In this case, the fact that the signals from the external position sensor are output at predetermined intervals of time, for example at a frequency of 1 Hz, is used as a criterion for when calibration can be carried out again. This bears in mind that, when surrounding conditions are not favorable, for example, in the mountains or on a road with a lot of multistory houses, it is not always possible to receive the signal from the external position sensor. In this case, the intervals of time between individual calibration operations are simply lengthened appropriately until a signal is received from the external position sensor again or other, prescribed conditions have arisen.

BRIEF DESCRIPTION OF THE DRAWINGS

The invention is described in more detail below with the aid of a preferred illustrative embodiment in conjunction with the drawing, in which.

DETAILED DESCRIPTION OF THE PREFERRED EMBODIMENT

Figure 1:
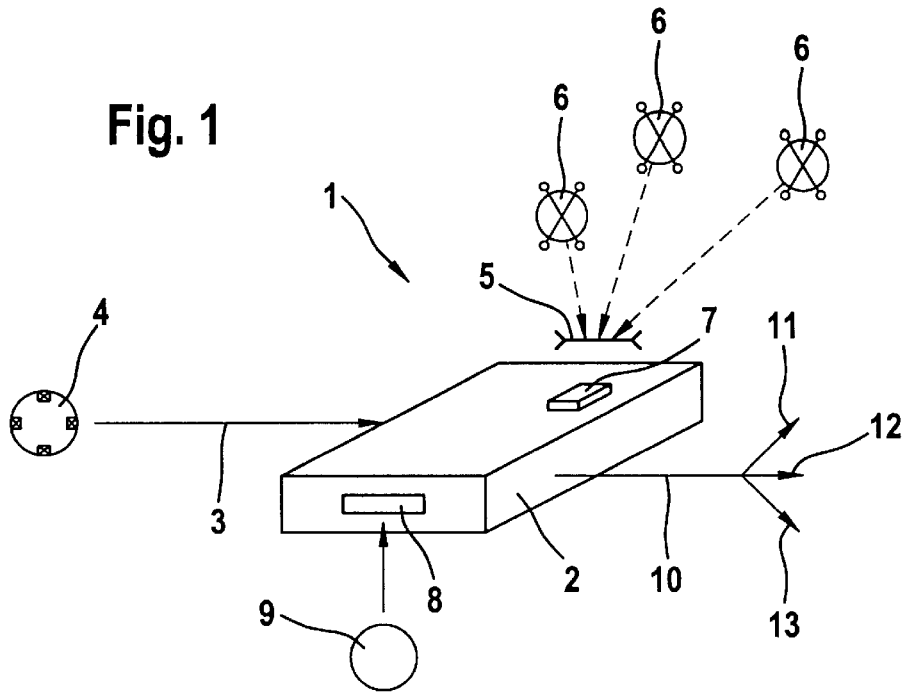
FIG. 1 shows a schematic illustration of a navigation system.

FIG. 1 shows a system 1 for navigating a land vehicle (not shown in more detail), for example a car or a truck.

The system 1 has a processing device 2. The processing device 2 has an input 3 which can be used to supply pulses from a tachometer 4. The tachometer 4 is connected (not shown in more detail) to a wheel which, as stipulated, is in permanent contact with the ground. While the vehicle is moving, the wheel is turned and outputs a predetermined number of pulses per revolution, in the present case four pulses.

The processing device 2 also has an antenna 5 which it is able to use to receive signals from satellites 6. As is known from the global positioning system, or GPS, the position of the processing device 2 can then be determined relatively accurately if the distance from three satellites 6 can be measured, for example using the delay time of signals between the satellites 6 and the antenna 5. However, the position which can be ascertained by this means is subject to an inaccuracy in the order of magnitude of 50 to 100 m.

The processing device 2 also has (not shown in more detail) a device 7 for determining a direction of movement. In many cases, this is in the form of a gyroscope. However, as it is not of any great significance for the present invention, it is not described in any more detail.

For the sake of completeness, it should be mentioned that the processing device 2 also has a holding channel 8 for a data medium 9, for example a CD-ROM. By way of example, the data medium 9 may store a map in the form of a database.

The processing device 2 has an output 10 connected to three gag modules (not shown in more detail) performing various tasks, namely position determination in module 11, route planning in module 12, and navigation in module 13, i.e., instructions for guiding the vehicle driver.

For the position ascertained in the module 11, the distance covered by the vehicle is significant, amongst other things. This is because the current position can be ascertained by compiling the direction and the distance covered in this direction on the basis of vectors, starting from a starting position.

Figure 2:
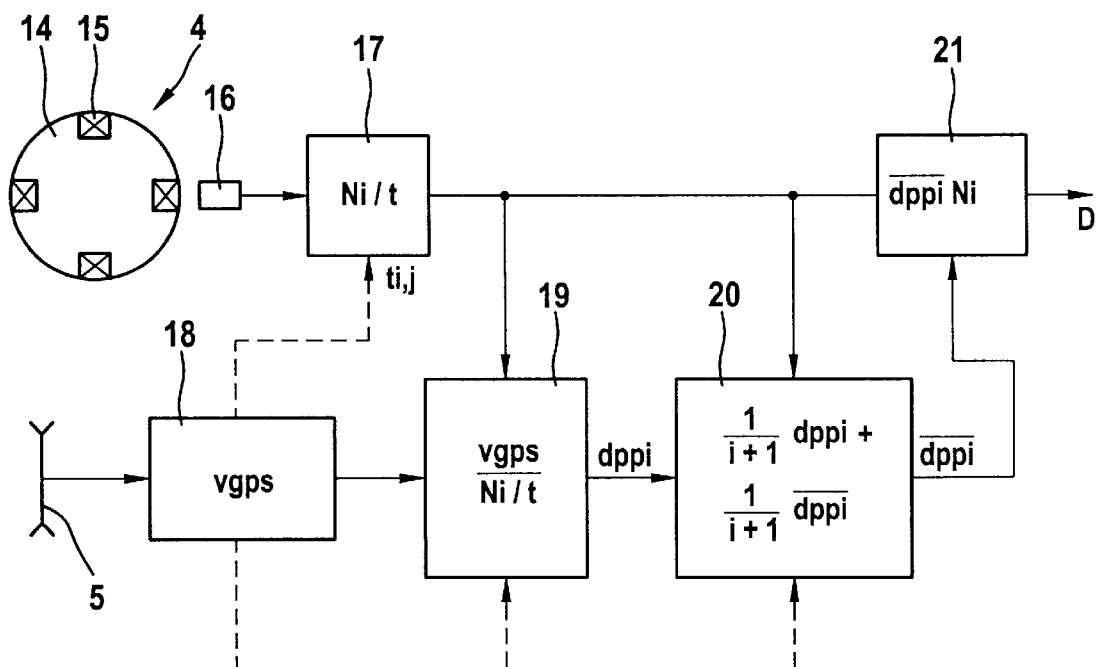
FIG. 2 shows a schematic block diagram for ascertaining a path length variable.

To ascertain the distance covered, the tachometer 4 is used. The procedure is described with the aid of FIG. 2.

The tachometer 4 has a sensor wheel 14 having four pulse transmitters 15. The sensor wheel 14 rotates in sync with a wheel which is in permanent contact with the ground. The pulse transmitters pass a pickup 16. It is also possible to obtain the information in a different way, for example using a pulse transmitter on an anti-lock brake system or using an electronic tachometer. In the present illustrative embodiment, therefore, four pulses are produced per revolution of said wheel. In most cases, however, many more pulses are produced per revolution, for example 20. These pulses Ni are counted in a counter 17. This ascertains the pulses per unit time. This is illustrated by the expression Ni/t.

At the same time, signals are received from the satellites 6 via the antenna 5. A speed determination device 18 uses the Doppler effect to ascertain the speed vgps, i.e., the speed at which the vehicle is moving relative to the ground.

The speed determination device 18 ascertains the speed vgps at a frequency of 1 Hz and also stipulates the starting and ending instant ti,j for the counter 17. The ending instant tj of one counting interval is at the same time the starting instant ti for the next interval.

Since the circumference of the wheel is in any case known in principle and can be used to calculate the distance covered between two pulses, the variable Ni/t ascertained in the counter 17 can be used to calculate a first speed value. This speed value may still contain errors, however, because the circumference of the wheel can change in operation, for example on account of the centrifugal force at relatively high speeds, on account of temperature influences, or on account of vehicle loads. To compensate for these errors, a correction device 19 divides the second speed value, namely the speed vgps, by the first value Ni/t. This gives an output variable dppi, where the abbreviation dpp stands for distance per pulse and i indicates the number of the counting interval.

For the sake of form, it should be noted here that division by time in the counter 17 is not essentially necessary, because the information about the period of time is also forwarded to the correction device 19 by the speed determination device 18, as illustrated by dashed lines.

Arranged in series with the correction device 19 is a filter 20 which forms a filtered value $\overline{dppi}_{new}$ on the basis of the following formula $$\overline{dppi}_{new} = \frac{i}{i+1}\overline{dppi}_{alt} + \frac{1}{i+1}dppi$$

where i forms a running counter from 0 to $n_{max}$ and remains constant once $n_{max}$ has been reached. By way of example, $n_{max}=128$ can be set for $n_{max}$.

The filtered value $\overline{dppi}_{new}$ is regarded as calibrated and can be used accordingly $i \geq 15$. Otherwise, a calibrated value from another class is used where possible, and otherwise $\overline{dppi}_{new}$.

The product of the pulses Ni and the corrected distance per pulse $\overline{dppi}$ can then be used to calculate the distance D covered.

It is also possible to implement a number of additional conditions. For example, the acceleration agps can be ascertained by means of the satellite 6. If this acceleration is greater than 1 m/s$^2$, for example, then calibration of the dppi values is interrupted. After a certain acceleration, the speed within an interval can no longer be ascertained with the required degree of accuracy. The speed ascertained by means of the satellite 6 should also be higher than 5 m/s.

In addition, the individual speeds can be classified in a plurality of classes, for example the first class from 0 to 70 km/h, the second class from 70 to 130 km/h and the third class from 130 km/h up to the top speed of the vehicle concerned. Alternatively, the first class can also be made to extend over the entire speed range of the vehicle. The second and third classes are then subranges of this. In this case, two calibration values are also ascertained at speeds after the second class, so that the required number of calibration operations is reached more quickly in the first class. The higher the speed, the more accurate the measurement, both in the case of the Doppler effect and when ascertaining the values Ni (digitization errors).

By way of example, it is possible to provide that, as soon as a valid calibration value is available in the second class, this dppi value is also used for relatively low speeds. However, while no calibrated value has been obtained for the second class, the speed values for the first class are used.

What is claimed is:

1. A method for calibration of a path length variable for use in navigating a terrestrial vehicle wherein the path length variable is measured by determining the number of revolutions of a wheel, comprising the steps of ascertaining a first speed value using the number of revolutions of the wheel, ascertaining a second speed value using at least one external position sensor, classifying one of the two speed values in one of a plurality of classes, each class of which comprises a predetermined speed range, and ascertaining a calibration value in a class by using the speed values from the class.

2. The method as claimed in claim 1, wherein ascertaining the second speed value further comprises using the Doppler effect.

3. The method as claimed in claim 1, wherein calibration is ongoing, at least in sections.

4. The method as claimed in claim 3, further comprising, at predetermined speeds, using a calibration value from a predetermined higher speed class to ascertain a distance, if this calibration value is present.

5. The method as claimed in claim 1, further comprising ascertaining each calibration value using a multiplicity of calibration operations.

6. The method as claimed in claim 5, further comprising determining the calibration value by filtering the results of the individual calibration operations.

7. The method as claimed in claim 4, further comprising ascertaining each calibration value using a multiplicity of calibration operations.

8. The method as claimed in claim 7, further comprising determining the calibration value by filtering the results of the individual calibration operations.

9. The method as claimed in claim 1, wherein calibration is not carried out if an acceleration value determined by using the external position sensor exceeds a predetermined acceleration value.

10. The method as claimed in claim 9, wherein the predetermined acceleration value is 1 m/s$^2$.

11. The method as claimed in claim 1, wherein calibration is not carried out if the speed ascertained by using the external position sensor is less than 5 m/s.

12. The method as claimed in claim 8, wherein calibration is not carried out if the speed ascertained by using the external position sensor is less than 5 m/s.

13. The method as claimed in claim 1, wherein the path length variable ascertained is a distance per pulse, the pulses being integrated until a new signal is available from the external position sensor.

14. The method as claimed in claim 8, wherein the path length variable ascertained is a distance per pulse, the pulses being integrated until a new signal is available from the external position sensor.

* * * * *